United States Patent
Dettinger et al.

(10) Patent No.: US 7,747,640 B2
(45) Date of Patent: Jun. 29, 2010

(54) METHOD FOR REGENERATING SELECTED ROWS FOR AN OTHERWISE STATIC RESULT SET

(75) Inventors: Richard D. Dettinger, Rochester, MN (US); Janice R. Glowacki, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 11/038,710

(22) Filed: Jan. 20, 2005

(65) Prior Publication Data

US 2006/0161528 A1    Jul. 20, 2006

(51) Int. Cl.
G06F 17/30 (2006.01)
(52) U.S. Cl. .................. 707/766; 707/830; 707/820; 707/826; 711/118; 711/141; 711/146; 715/764
(58) Field of Classification Search ............ 707/3, 707/100, 2, 4, 5, 6, 9, 10, 101, 102; 711/118, 711/141, 146; 715/764
See application file for complete search history.

(56) References Cited

U.S. PATENT DOCUMENTS

| 5,734,888 | A  | * | 3/1998  | Li et al. ................. 707/4 |
| 5,926,807 | A  | * | 7/1999  | Peltonen et al. .......... 707/3 |
| 6,088,692 | A  | * | 7/2000  | Driscoll ................. 707/5 |
| 6,363,377 | B1 | * | 3/2002  | Kravets et al. .......... 707/4 |
| 6,393,415 | B1 | * | 5/2002  | Getchius et al. ......... 707/2 |
| 6,484,159 | B1 | * | 11/2002 | Mumick et al. .......... 707/2 |
| 6,725,227 | B1 |   | 4/2004  | Li |
| 7,174,342 | B1 | * | 2/2007  | Scheurich et al. ...... 707/102 |
| 2003/0167274 | A1 | * | 9/2003 | Dettinger et al. ....... 707/100 |
| 2004/0034616 | A1 | * | 2/2004 | Witkowski et al. ....... 707/1 |
| 2005/0108212 | A1 | * | 5/2005 | Karimisetty et al. ..... 707/3 |

* cited by examiner

Primary Examiner—Hosain T Alam
Assistant Examiner—Syling Yen
(74) Attorney, Agent, or Firm—Patterson & Sheridan, LLP

(57) ABSTRACT

Methods for updating query results are provided. In one embodiment, a stored query is modified to retrieve a selected subset of rows from stored query results without retrieving a remaining portion of the stored results. The modified query is executed, updated results are obtained from the modified query, and the updated results are displayed.

18 Claims, 14 Drawing Sheets

QUERY APPLICATION

QUERY RESULTS

| ROW | PATIENT_ID (IDENTIFIER VALUES) | LAST_NAME | TEST_TYPE | TEST_RESULTS |
|---|---|---|---|---|
| 1 | 612 — ☐ 123 | RUSSELL | TYPE A | 44 |
| 2 | 614 — ☐ 456 | SMITH | TYPE A | *47* |
| 4 | 616 — ☐ 789 | WATERS | TYPE A | 48 |
| 5 | 618 — ☐ 900 | GIBBONS | TYPE B | *48* |
| 6 | 620 — ☐ 905 | FIELD | TYPE A | 44 |
| 7 | 622 — ☐ 907 | WILSON | TYPE B | 42 |
| 8 | 624 — ☐ 930 | TURNER | TYPE A | 41 |

[ UPDATE ROWS ] — 610

*FIG. 10*

METHOD FOR REGENERATING SELECTED ROWS FOR AN OTHERWISE STATIC RESULT SET

BACKGROUND OF THE INVENTION

1. Field of the Invention

The present invention generally relates to a method for updating query results.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Information in a database may be constantly changing. For instance, in a database that stores medical records, new records may be added, old records may be deleted, and existing records may be updated with new information such as test results. A user executing queries against the database may wish to remain up-to-date with respect to the latest information in the database. For instance, the user may wish to remain up-to-date because the user may be conducting ongoing research using the database. One method for keeping the user up-to-date with respect to information in the database is to allow the user to store queries which the user has executed against the database. The user may run a query once to obtain an initial set of results and the user may decide to store the query. Later, the user may run the stored query again to obtain a new set of results. The user may also wish to store the results of the initial query execution for later reference, analysis, or comparison with subsequent results. The results stored by the user may be stored in a table consisting of several rows and columns of data.

In some cases, the user may wish to obtain updated results, but the user may not want to update the entire table of stored results. For instance, the user may only be interested in updating certain rows in the stored results because those rows contain information, such as test results, which the user is tracking. For instance, the user may wish to update results only with respect to a certain patient that the user is interested in. Where the results contain several rows for a single patient, representing different test dates for instance, the user may only wish to update results for those test dates. In other cases, the user may also wish to have outdated rows removed and to be informed of any new rows which have been added. If the user wants to update those desired rows, the user may have to rerun the stored query and update the entire table.

Rerunning the stored query may be costly. For instance, the stored query may be executed against a database with many tables and many records. The stored query may require many comparisons and calculations to be performed as well. When the user only wishes to see updated results for certain rows in the stored results, the user would prefer not to have to run the stored query and update the entire set of results because of the associated execution costs. Accordingly, what is needed is a method for updating results wherein the user only wishes to update a selection of the rows in the results.

SUMMARY OF THE INVENTION

The present invention generally provides methods for updating query results. One embodiment provides a method for updating query results. The method generally provides for receiving results for an executed query, wherein the results contain two or more rows, storing the query and the results, and receiving a request to update a selected subset of the two or more rows in the stored results, the subset being less than all of the two or more rows. The stored query is retrieved from storage, and, in response to the request, the retrieved query is modified to retrieve the selected subset of rows without retrieving a remaining portion of the two or more rows. The modified query is executed, updated results are obtained from the modified query, and the updated results are displayed.

Another embodiment provides a computer-implemented method for updating query results. The method generally provides for receiving results for an executed query, wherein the results contain two or more rows and wherein each row contains a data value in a restricting data field. The query and the results are stored. The method further provides for receiving a request to update a selected subset of two or more rows in the stored results, the subset being less than all of the two or more rows, and retrieving the stored query from storage. In response to the request, the retrieved query is modified to retrieve the selected subset of rows without retrieving a remaining portion of the two or more rows, wherein modifying the retrieved query comprises inserting a first query condition into the retrieved query, wherein the first query condition contains the respective data value in the restricting data field for the selected subset of rows. The modified query is executed, updated results are obtained from the modified query, and the updated results are displayed.

Yet another embodiment provides a method of programmatically providing a user interface for updating query results. The method generally includes providing graphical user interface content which defines a graphical user interface. The graphical user interface generally includes a listing of two or more results rows, the results rows obtained from a query, and a graphical selection element for each of the two or more results rows which may be used to select each of the two or more results rows individually. The method further provides for receiving a request to update one or more selected rows from the two or more results rows, wherein the graphical selection element for each of the two or more results rows is used to individually select the one or more selected rows, and modifying the query to retrieve the one or more selected rows without retrieving a remaining portion of the two or more results rows. For at least those of the one or more selected rows having updated values, the modified results are displayed, the modified results being returned as results of the executed modified query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 10 depicts a graphical user interface for displaying updated results according to one embodiment of the invention;

DETAILED DESCRIPTION OF THE PREFERRED EMBODIMENTS

Figure 1:
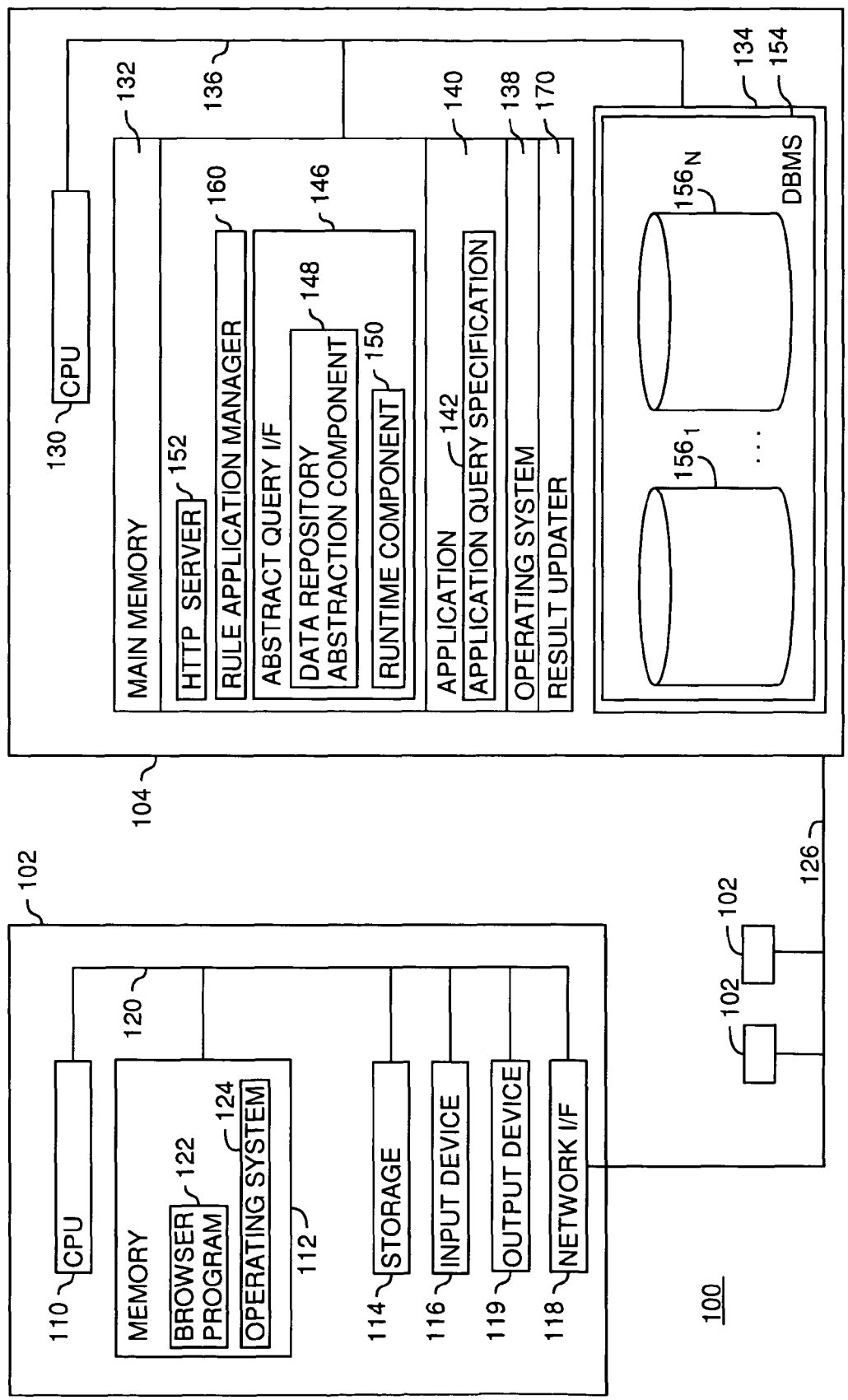
FIG. 1 is one embodiment of a computer system utilized in accordance with the invention.

The present invention generally provides methods for updating query results. Embodiments generally provide for receiving results for an executed query, wherein the results contain two or more rows, storing the query and the results, and receiving a request to update a selected subset of the two or more rows in the stored results, the subset being less than all of the two or more rows. The stored query is retrieved from storage, and, in response to the request, the retrieved query is modified to retrieve the selected subset of rows without retrieving a remaining portion of the two or more rows. The modified query is executed, updated results are obtained from the modified query, and the updated results are displayed.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While embodiments below are described with reference to a system utilizing abstract queries and data abstraction, other embodiments of the invention are contemplated in which the queries being executed by the user are executed against a database which does not utilize abstract queries and data abstraction.

One embodiment of the invention is implemented as a program product for use with a computer system such as, for example, the computer system shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104 is shown). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 120 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140, an abstract query interface 146 and a rule application manager 160. The applications 140, the abstract query interface 146 and the rule application manager 160 are software products having a plurality of instructions that are resident at various times in various memory and storage devices in the computer system 100. When read and executed by one or more processors 130 in the server 104, the applications 140, the abstract query interface 146 and the rule application manager 160 cause the computer system 100 to perform the steps necessary to execute steps or elements embodying the various aspects of the invention. The applications 140 (and more generally, any requesting entity, including the operating system 138 and, at the highest level, users) issue queries against a database (e.g., databases $156_1 \ldots 156_N$, collectively referred to as database(s) 156). Illustratively, the databases 156 are shown as part of a database management system (DBMS) 154 in storage 134. The databases 156 are representative of any collection of data regardless of the particular physical representation. By way of illustration, the databases 156 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The memory 132 may also include a result updater 170 according to one embodiment of the invention. The result updater 170 may be used to store and update results according to one embodiment of the invention. The operation of the result updater 170 is described below in greater detail.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 which first transforms the abstract queries into a form consistent with the physical representation of the data contained in the DBMS 154, e.g., by translating abstract queries into concrete queries. The rule application manager 160 implements a rule application mechanism for restricting queryable data to a subset of all available data contained in the DBMS 154. In one embodiment, the rule application manager 160 restricts the queryable data by redefining a query that is executed against the database in order to execute the redefined query against the queryable data. Alternatively, the rule application manager 160 restricts the queryable data using a condition retrieved from storage when executing a received query. Still alternatively, the rule application manager 160 restricts the queryable data by modifying the data repository abstraction component. The application query specification 142, the abstract query interface 146 and the rule application manager 160 are further described with reference to FIGS. 2A-B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (HTTP) server process 152 (e.g., a web server) adapted to service requests from the client computer 102. For example, the process 152 may respond to requests to access a database(s) 156, which illustratively resides on the server 104. Incoming client requests for data from a database 156 invoke an application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown. Likewise, the HTTP server process 152 shown in FIG. 1 is merely illustrative and other embodiments adapted to support any known and unknown protocols are contemplated.

Logical/Runtime View of Environment

Figure 2A:
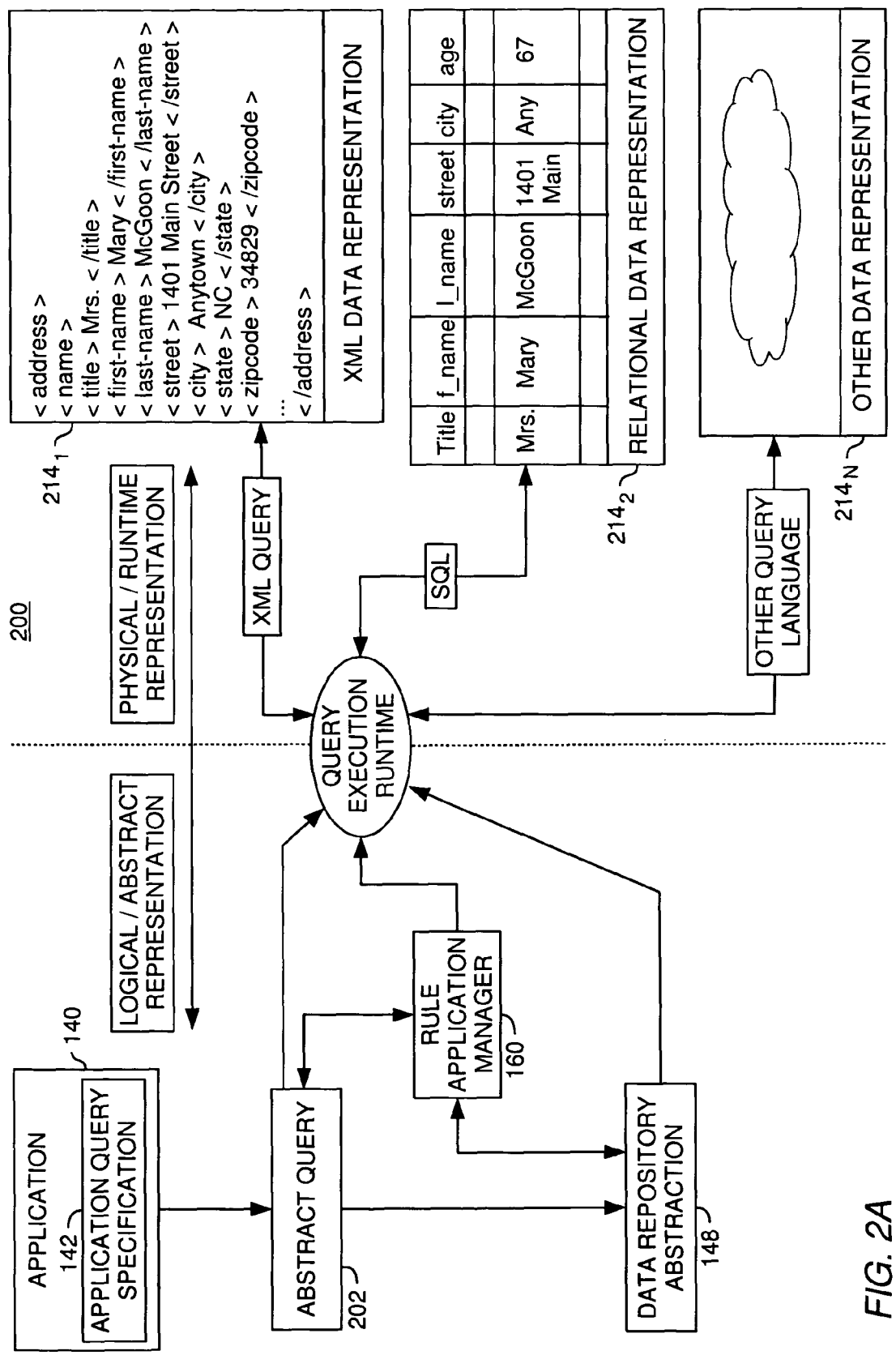
FIGS. 2A-B are relational views of software components of one embodiment of the invention.
Figure 2B:
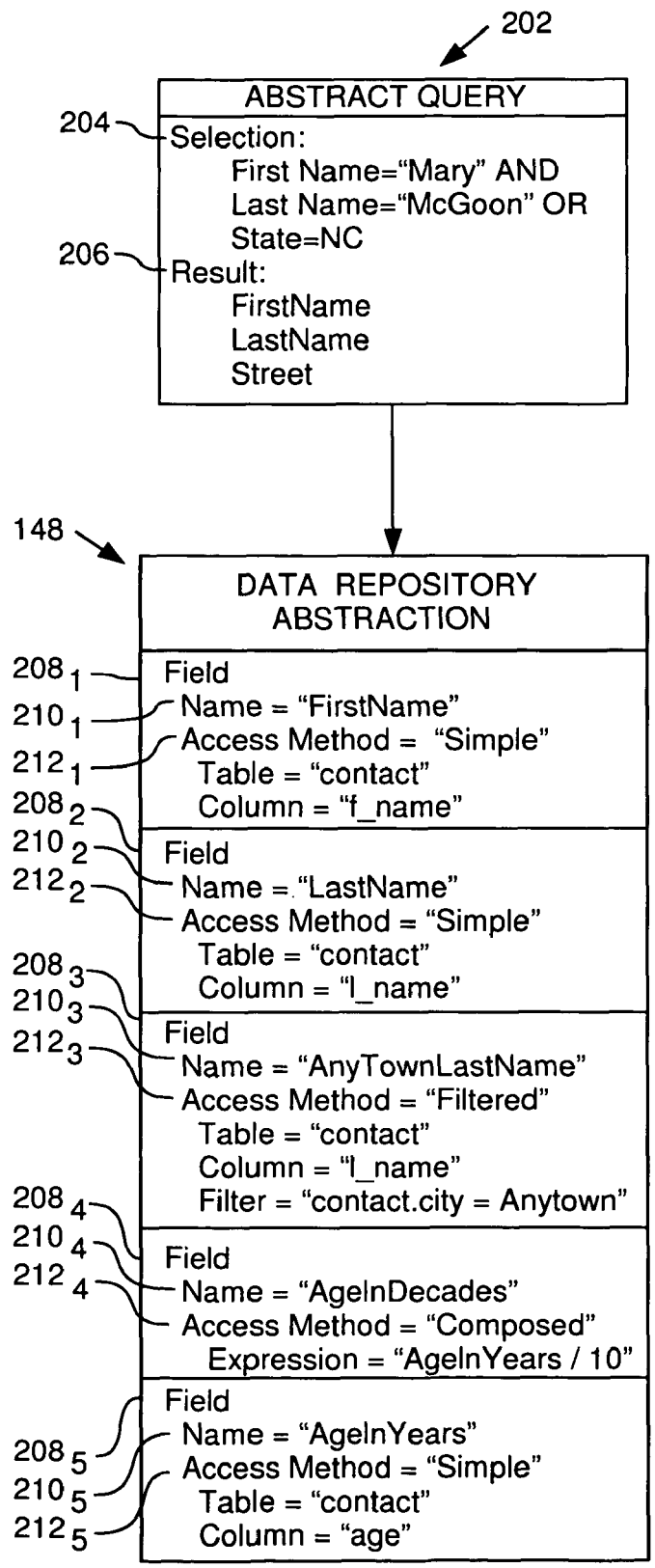

FIGS. 2A-B show an illustrative relational view 200 of components of the invention. A requesting entity (e.g., one of the applications 140 of FIG. 1) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the DBMS 154, thereby allowing queries to be formed that are loosely coupled to the underlying data representation.

In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the database 156, thereby allowing queries to be formed that are loosely coupled to the underlying data representation.

In one embodiment, the data repository abstraction component 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification contains a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in the database (e.g., database 156). By way of illustration, two data representations are shown, an XML data representation $214_1$ and a relational data representation $214_2$. However, the physical data representation $214_N$ indicates that any other data representation, known or unknown, is contemplated. In one embodiment, a single data repository abstraction component 148 contains field specifications (with associated access methods) for two or more physical data representations 214. In an alternative embodiment, a different single data repository abstraction component 148 is provided for each separate physical data representation 214.

Any number of access methods is contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide filters used to define a particular subset of items within the physical data representation. An example is provided in FIG. 2B in which the filtered field access method $212_3$ maps the logical field name $210_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B the composed field access method $212_4$ maps the logical field name $210_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case a conversion of the underlying physical data into the format of the logical field is required.

By way of example, the field specifications 208 of the data repository abstraction component 148 shown in FIG. 2 are representative of logical fields mapped to data represented in the relational data representation $214_2$. However, other instances of the data repository abstraction component 148 map logical fields to other physical data representations, such as XML.

An illustrative abstract query corresponding to the abstract query 202 shown in FIG. 2B is shown in TABLE I below. By way of illustration, the illustrative abstract query is defined using XML. However, any other language may be used to advantage.

TABLE I

ABSTRACT QUERY EXAMPLE

| | |
|---|---|
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 |   <Selection> |
| 006 |     <Condition internalID="4"> |
| 007 |       <Condition field="FirstName" operator="EQ" value="Mary" |
| 008 | internalID="1"/> |
| 009 |       <Condition field="LastName" operator="EQ" value="McGoon" |
| 010 | internalID="3" relOperator="AND"></Condition> |
| 011 |     </Condition> |
| 012 |     <Condition field="State" operator="EQ" value="NC" internalID="2" |
| 013 | relOperator="OR"></Condition> |
| 014 |   </Selection> |
| 015 |   <Results> |
| 016 |     <Field name="FirstName"/> |
| 017 |     <Field name="LastName"/> |
| 018 |     <Field name="Street"/> |
| 019 |   </Results> |
| 020 | </QueryAbstraction> |

Illustratively, the abstract query shown in TABLE I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative Data Repository Abstraction is shown in TABLE II below. By way of illustration, the illustrative Data Repository Abstraction is defined using XML. However, any other language may be used to advantage.

TABLE II

DATA REPOSITORY ABSTRACTION EXAMPLE

| | |
|---|---|
| 001 | <?xml version="1.0"?> |
| 002 | <DataRepository> |
| 003 |   <Category name="Demographic"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |       <Type baseType="char"></Type> |
| 009 |     </Field> |
| 010 |     <Field queryable="Yes" name="LastName" displayable="Yes"> |
| 011 |       <AccessMethod> |
| 012 |         <Simple columnName="l_name" tableName="contact"></Simple> |
| 013 |       </AccessMethod> |
| 014 |       <Type baseType="char"></Type> |
| 015 |     </Field> |
| 016 |     <Field queryable="Yes" name="State" displayable="Yes"> |
| 017 |       <AccessMethod> |
| 018 |         <Simple columnName="state" tableName="contact"></Simple> |
| 019 |       </AccessMethod> |
| 020 |       <Type baseType="char"></Type> |
| 021 |     </Field> |
| 022 |   </Category> |
| 023 | </DataRepository> |

Figure 3:
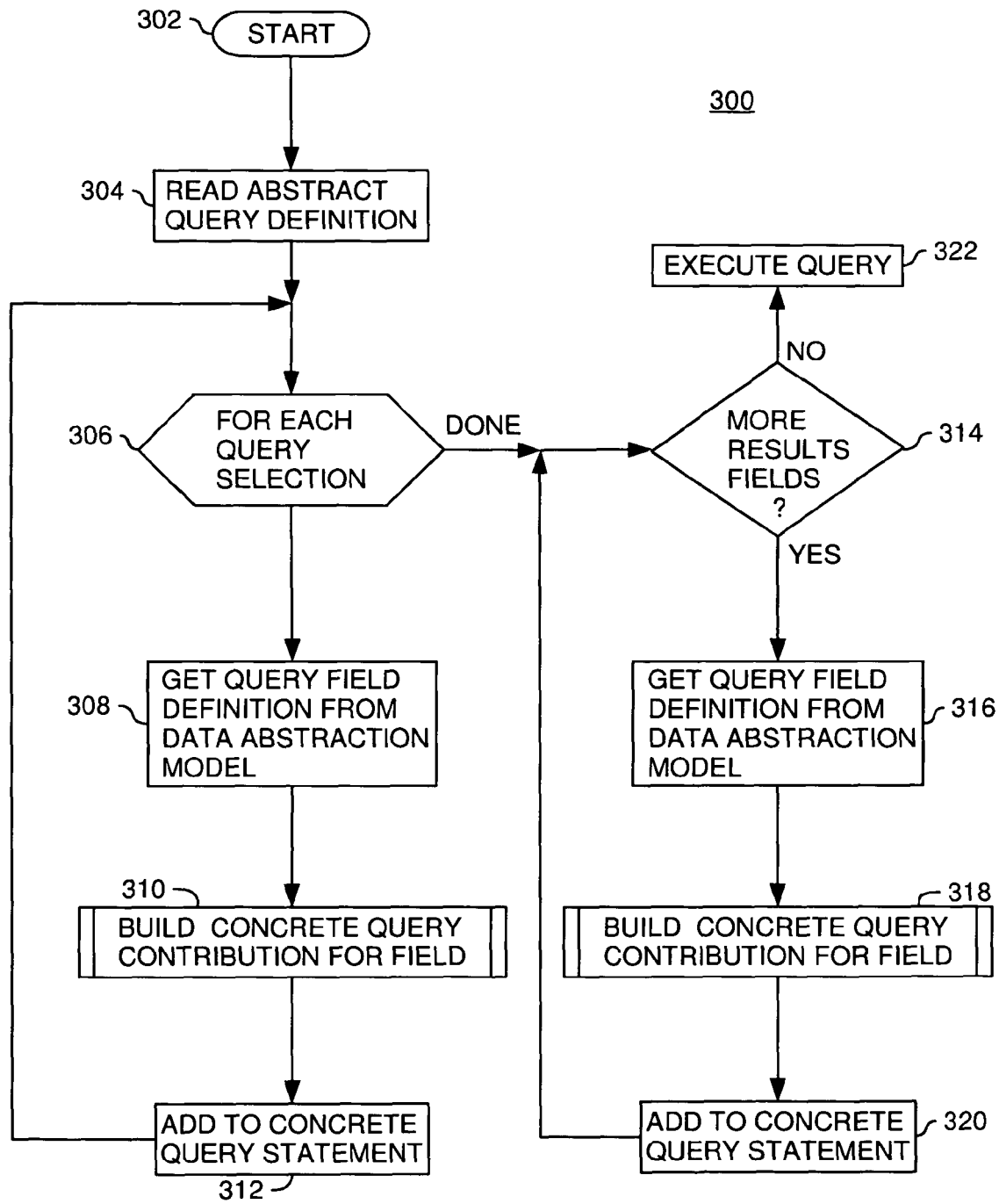
FIG. 3 is a flow chart illustrating the operation of a runtime component according to one embodiment of the invention.

FIG. 3 shows an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the DBMS 154 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement.

Once each of the result specifications in the abstract query has been processed, the query is executed at step 322.

Figure 4:
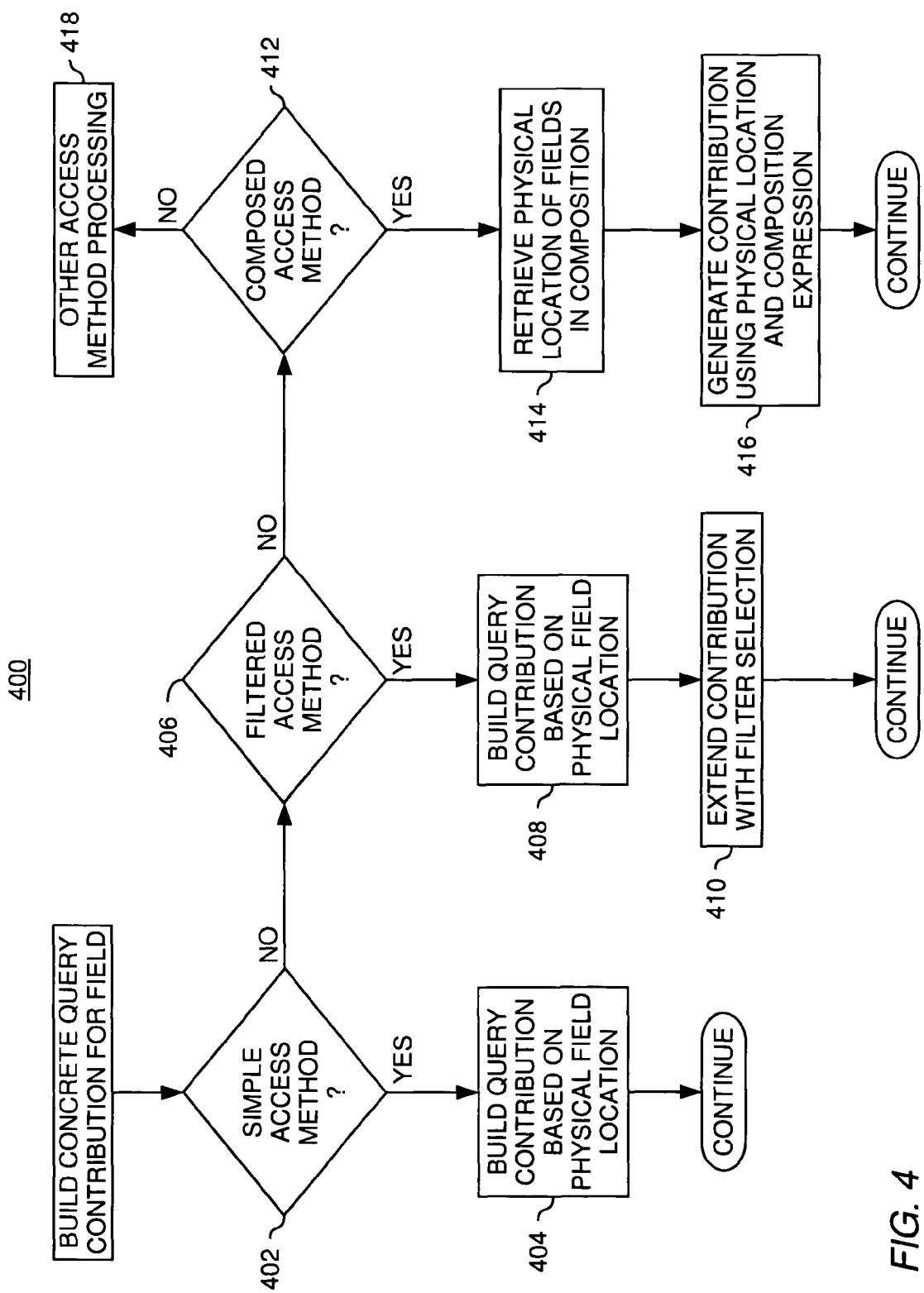
FIG. 4 is a flow chart illustrating the operation of a runtime component according to one embodiment of the invention.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Updating Query Results

As described above, a user executing queries in a database system may wish to store the results of a query and later update a selected subset of rows contained in the results. The user may not wish to update the results by rerunning the original query because rerunning the original query would update the entire set of results. Rerunning the original query may also take time and be computationally expensive. Embodiments of the invention allow the user to update the selected subset of rows without rerunning the original query by executing a modified query which retrieves the selected subset of rows without retrieving the remaining portion of the results.

Figure 5A:
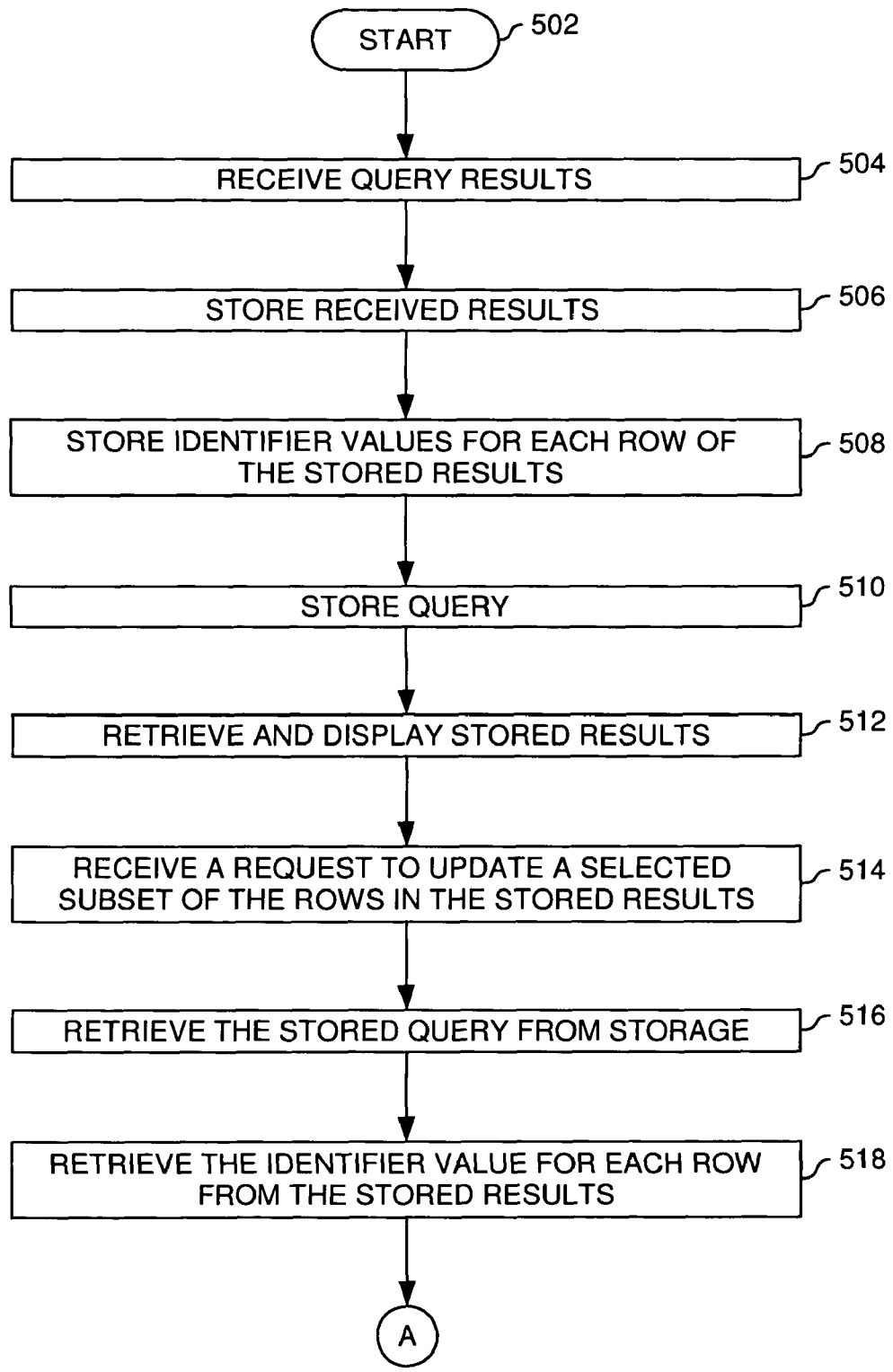
FIG. 5 depicts a process for saving and updating query results according to one embodiment of the invention.
Figure 5B:
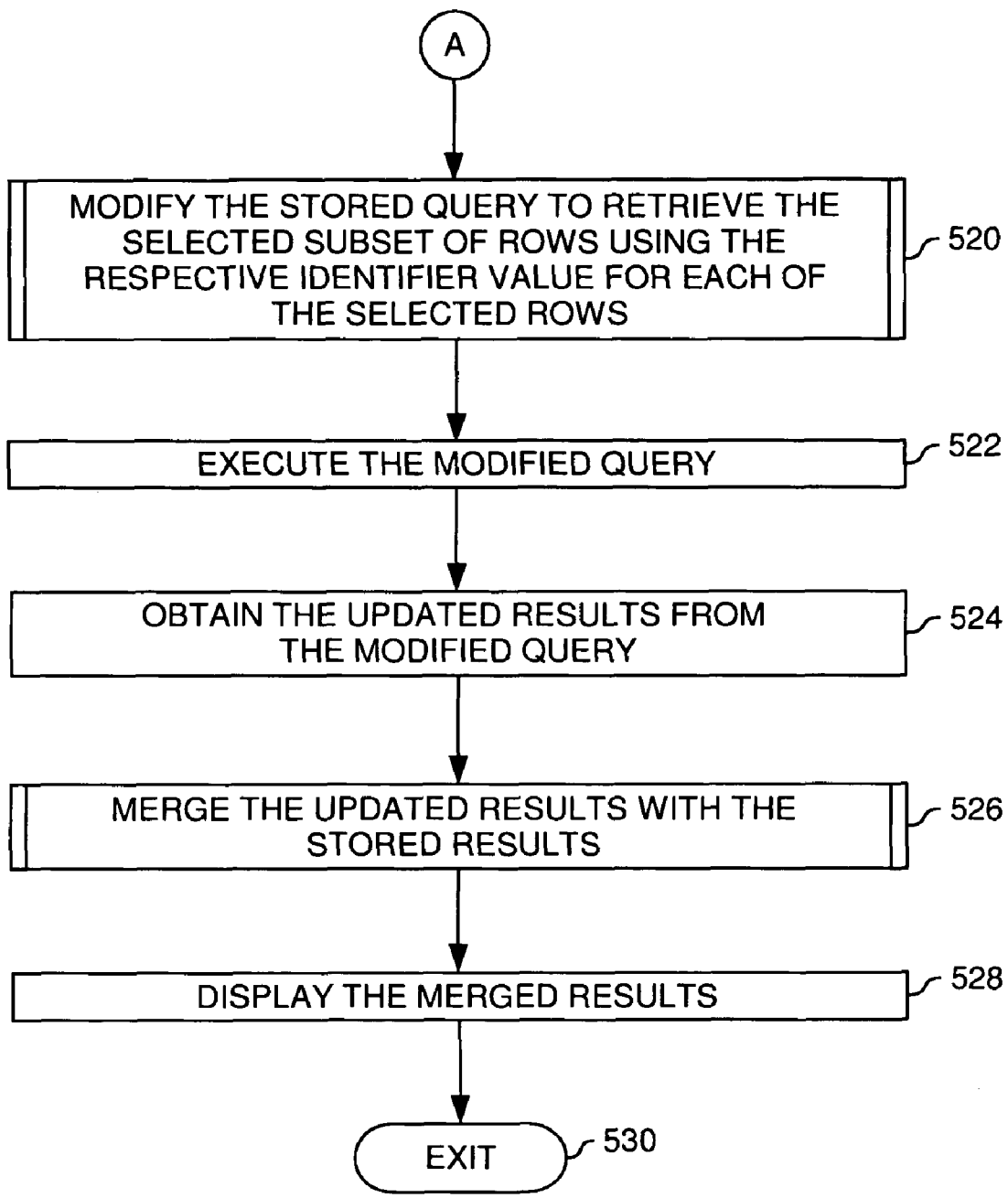

After receiving a user's abstract query, transforming the abstract query into a concrete query, and executing the query (as described above with respect to FIGS. 3-4), the process 500 for saving and updating query results may be initiated. FIG. 5 depicts a process 500 for saving and updating query results according to one embodiment of the invention. According to one embodiment of the invention, the process 500 may be performed by the result updater 170. In other embodiments, the process 500 may be performed by other components such as the runtime component 150, or by any other application located on the server 104 or the client computer 102.

In order to better understand the process 500 for saving and updating query results, consider the following exemplary database tables and exemplary query.

TABLE III

EXEMPLARY PATIENT INFORMATION TABLE
Name: Table1

| Patient_ID (Primary Key) | Last_Name | First_Name | Birth_Date |
|---|---|---|---|
| 123 | Russell | Kevin | Oct. 15, 1935 |
| 456 | Smith | Bill | Sep. 6, 1946 |
| 789 | Waters | Jane | Nov. 2, 1933 |
| 900 | Gibbons | Lindsey | Apr. 4, 1950 |
| 905 | Field | Albert | Jun. 28, 1942 |
| 907 | Wilson | Leticia | Sep. 9, 1939 |
| 921 | Johnson | Wayne | Aug. 13, 1943 |
| 930 | Turner | Judith | Jul. 30, 1952 |

TABLE IV

EXEMPLARY TEST RESULT TABLE
Name: Table2

| Patient_ID | Test_Type | Test_Results | Test_Date |
|---|---|---|---|
| 123 | Type A | 44 | Sep. 1, 2004 |
| 456 | Type A | 46 | Aug. 30, 2004 |
| 456 | Type B | 48 | Sep. 9, 2004 |
| 789 | Type A | 48 | Sep. 12, 2004 |
| 900 | Type B | 59 | Sep. 21, 2004 |
| 905 | Type A | 44 | Sep. 2, 2004 |
| 907 | Type B | 42 | Aug. 22, 2004 |
| 921 | Type B | 34 | Oct. 8, 2004 |
| 930 | Type A | 41 | Aug. 28, 2004 |
| 930 | Type B | 39 | Sep. 15, 2004 |

TABLE V

EXEMPLARY QUERY

| 001 | SELECT |
| 002 | Table1.Patient_ID |
| 003 | Table1.Last_Name |
| 004 | Table2.Test_Type |
| 005 | Table2.Test_Results |
| 006 | WHERE |
| 007 | Table1.Patient_ID = Table2.Patient_ID AND |
| 008 | Table2.Test_Results > 40 |
| 009 | ORDER BY |
| 010 | Table1.Patient_ID ASC |

The database being searched may contain two tables. The first table, called "Table1" and shown in TABLE III above, may have columns containing various patient information such as a patient ID, the patient's last name, the patient's first name, and the patient's birth date. The second table, called "Table2" and shown in TABLE IV above, may have data about each patient's test results. The second table contains the patient ID, the patient's test result, the test type, and the test date.

The exemplary query displayed in TABLE V consists of three parts. The first part, the "SELECT" clause, selects values which will be displayed as columns in the results. The "SELECT" clause in the exemplary query selects four columns to be displayed: the Patient ID from Table1, the last name of the patient from Table1, the test type from Table2, and the test results from Table2. The second clause in the exemplary query, the "WHERE" clause, limits the data which will be selected by the "SELECT" clause. In the "WHERE" clause, data from the "SELECT" clause is limited to rows where the Patient ID is the same in Table1 and Table2 ("Table1.Patient_ID=Table2.Patient_ID") and where the value in the test results column of Table2 is greater than 40 ("Table2.Test_Results>40"). The third clause, the "ORDER BY" clause, specifies how the results should be ordered, in this case by the Patient ID number in ascending order. Thus, the exemplary query has the effect of displaying the Patient ID, the last name, the test type, and the test results for patients whose test results are greater than 40. The results of the exemplary query are shown in TABLE VI below.

TABLE VI

RESULTS OF THE EXEMPLARY QUERY

| Patient_ID | Last_Name | Test_Type | Test_Results |
|---|---|---|---|
| 123 | Russell | Type A | 44 |
| 456 | Smith | Type A | 46 |
| 456 | Smith | Type B | 48 |
| 789 | Waters | Type A | 48 |
| 900 | Gibbons | Type B | 59 |
| 905 | Field | Type A | 44 |
| 907 | Wilson | Type B | 42 |
| 930 | Turner | Type A | 41 |

The process 500 for storing and updating results may begin at step 502 and continue to step 504 where the results from the execution of the query, shown in Table VI, are received. The results may be received in a file, data structure, as a stream of data, or by any means known to those skilled in the art. At step 506 the received results may be stored. The results may be stored so the user may later view the results and use them to select which rows the user would like to update (described below). The results of the query may be stored on the storage device 134 according to one embodiment of the invention. In other embodiments, the results may be stored on a storage server or in the storage 114 on the client computer 102.

After storing the query results at step 506, identifier values for each row in the stored results may also be stored at step 508. Identifier values are values which are used to identify rows in the stored results. Identifier values are typically stored in the same database and in some cases in the same tables as the data which is being queried. The identifier values may include primary keys, foreign keys, indexes, unique indexes, or any other identifier values known to those skilled in the art. The identifier values may also be marked as identifier values within the database, marked as an attribute of a logical field in a data repository abstraction (described above), or the identifier values may be implicitly marked or used as identifier values inside the programs and components which use them, such as the runtime component 150.

In one embodiment of the invention, the identifier values may be identified, retrieved, and stored separately from the received results. According to other embodiments of the invention, the identifier values may be identified, retrieved, and stored simultaneously with the results, or as a part of the results themselves. With respect to the exemplary query and results, the identifier values are the values in the Patient_ID column, and are thus received as part of the results. The values in the Patient_ID column are recognizable as identifier values in the underlying database tables because the Patient_ID column is labeled as a primary key column in the underlying database table (Table1). The identifier values may be identified as such by parsing the query to determine which tables in the database are being searched (in this case, Table1 and Table2). The attributes of the columns in the tables being searched may then be analyzed to determine which column contains the identifier values (here, Table1 contains the column Patient_ID which has the primary key attribute and thus contains the identifier values). In other embodiments of the invention, the identifier values may not be determined until they are actually used to identify the rows in the stored results (described below).

While the identifier values may be used to identify rows in the stored results, the identifier values may not be unique for each row. In other words, a given identifier value may identify two or more rows in a given set of results. For instance, as shown in Table VI, the retrieved rows contain test results and the identifier value for each row is a patient ID for the patient undergoing the test. However, because a patient may take different tests, or because a patient may take the same test on different dates, the results may contain several rows of test results for the same patient, each of which is identified by the same patient ID. Thus, with respect to TABLE VI, the identifier value for patient 456 appears twice because the patient, Bill Smith, was tested on two different dates (Aug. 30, 2004 and Sep. 9, 2004), both of which resulted in a test value above 40. Use of the identifier value in updating the results is described below in greater detail.

After storing the identifier values for each row of the stored results, the query may be stored at step 510. The query may be stored so that it may be later modified and executed to update the results upon receiving an update request. In some embodiments of the invention, the user may also be allowed to retrieve the stored query, modify the stored query, and/or re-execute the stored query.

Figure 6:
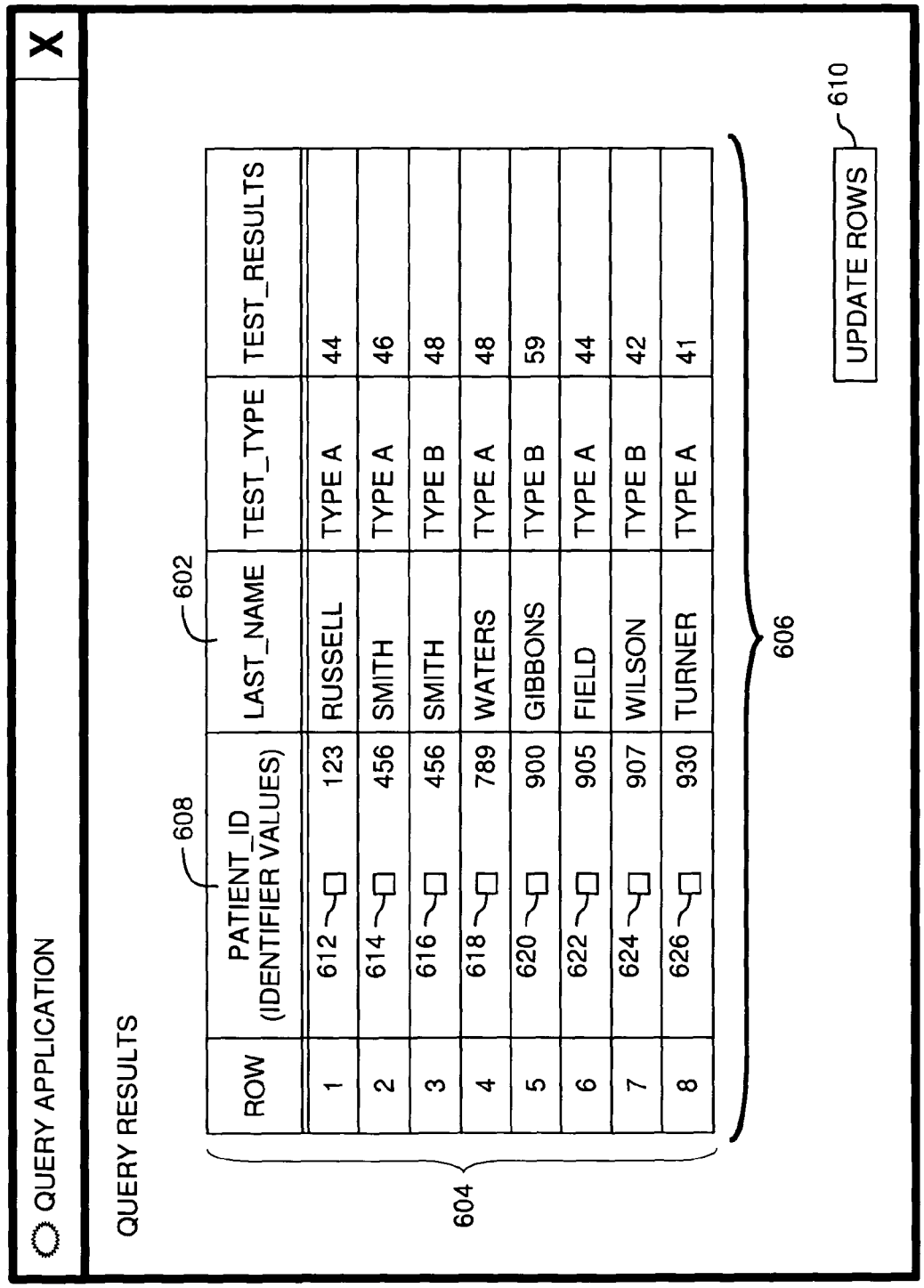
FIG. 6 depicts a graphical user interface for displaying stored results according to one embodiment of the invention.

After the results, identifier values, and query have been stored, the stored results may be retrieved and displayed at step 512. FIG. 6 depicts a graphical user interface 600 for displaying the stored results according to one embodiment of the invention. The graphical user interface 600 may contain a table 602 with rows 604 and columns 606 of results. The table 602 may also provide the identifier value for each row in a column 608 as well as graphical selection elements 612-626 for selecting one or more of the rows 604 to be updated. The graphical user interface may also contain a graphical element 610 for initiating requests to update the results.

According to one embodiment of the invention, the results may be immediately displayed to the user after the results have been stored. According to another embodiment of the invention, the results may be stored until the user later requests to view the results. In other embodiments of the invention, the user may be provided with other options regarding the results, such as the ability to download the results from the server computer 104, the ability to delete unwanted results, or other options for manipulating stored results generally known to those skilled in the art.

Figure 7:
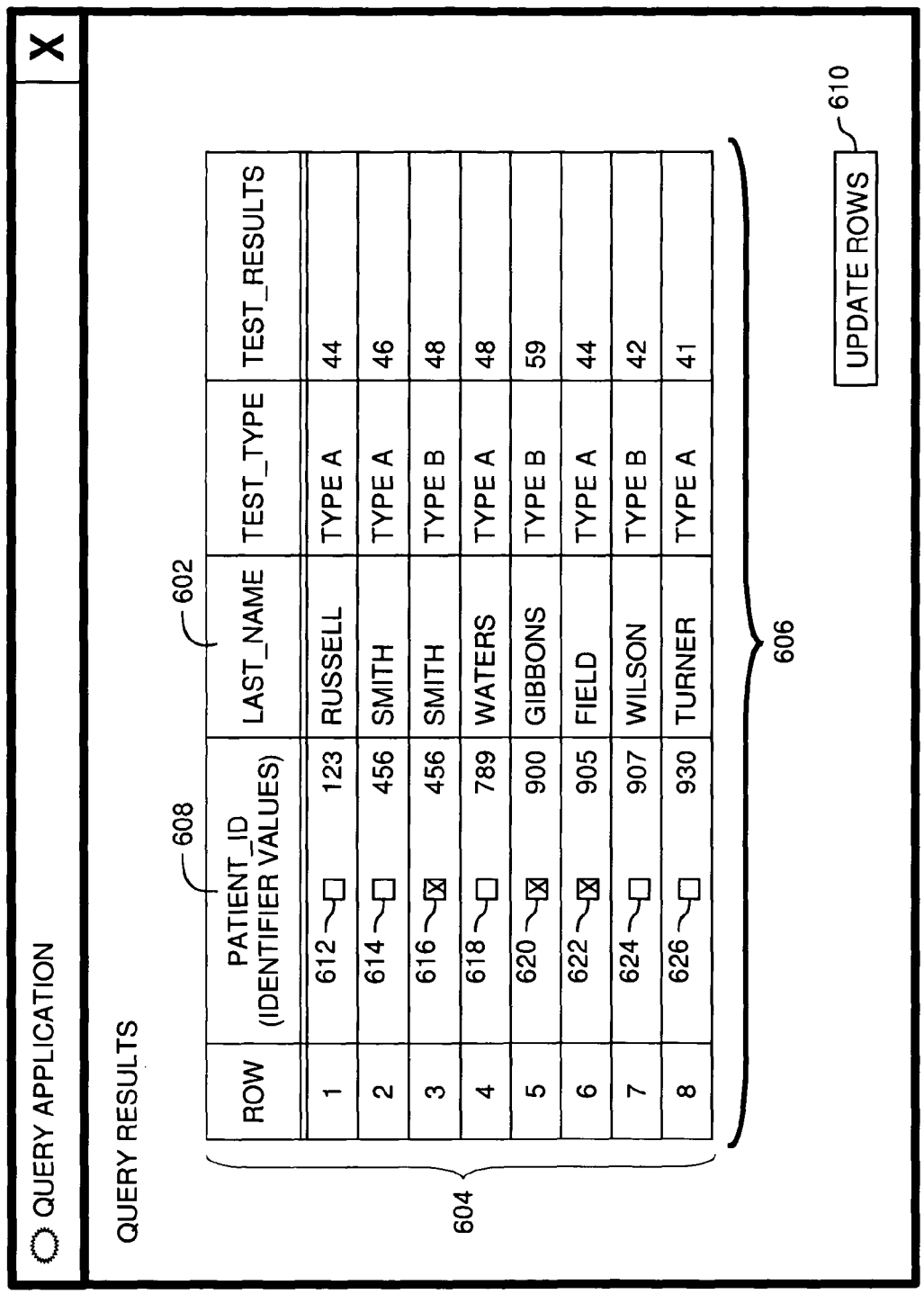
FIG. 7 depicts a graphical user interface containing selected rows according to one embodiment of the invention.

After retrieving and displaying the stored results, a request to update a selected subset of the rows in the stored results may be received at step 514. The request may be made by any requesting entity such as a user or computer program. According to one embodiment of the invention, the subset of rows may be selected by the user using the graphical selection elements 612-626 provided in the graphical user interface 600 for displaying the results. For instance, as depicted in FIG. 7, the user may have selected rows 3, 5, and 6 to be updated by clicking on the graphical selection elements 616, 620, 622. According to another embodiment, the subset of rows may selected by allowing the user to enter the identifier values for the rows to be selected. The request to update the rows may be initiated by activating the graphical element 610 for initiating update requests. According to another embodiment of the invention, the request may be made by keyboard input, such as a keyboard shortcut. The subset of rows may also be selected and the request may also be initiated by other means known to those skilled in the art according to other embodiments of the invention.

After the request to update the query has been received, the stored query may be retrieved at step 516 and the identifier values for the selected rows may be loaded at step 518. The stored query and the identifier values are retrieved in order to create a modified query which will update the selected rows without having to run the original query and update the entire set of results. At step 520, the query may be modified to retrieve the selected subset of rows using the respective identifier value for each of the selected rows. The process for modifying the stored query is depicted in FIG. 8.

Figure 8:
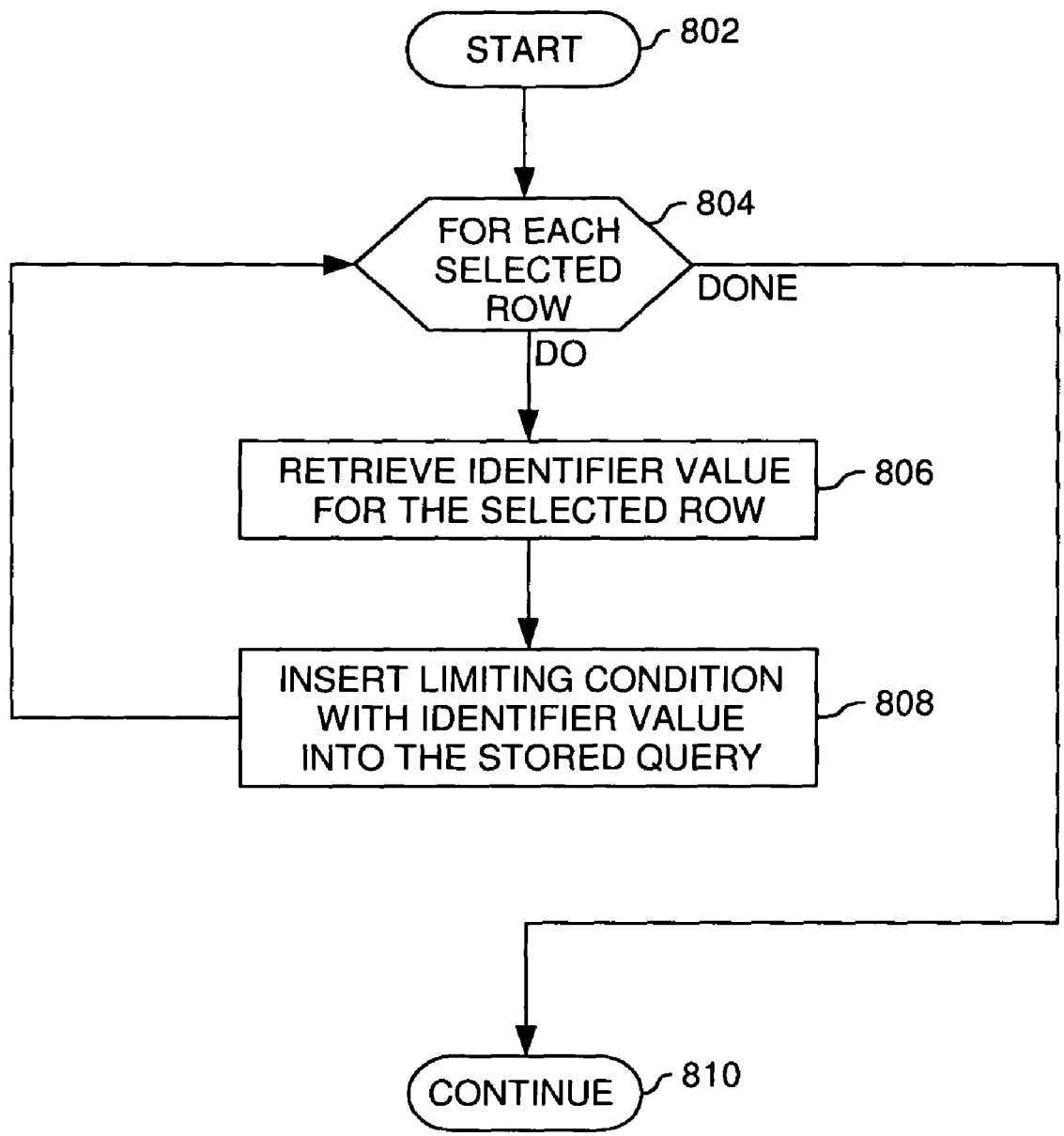
FIG. 8 depicts a process for modifying a stored query in order to retrieve a selected subset of rows according to one embodiment of the invention.

FIG. 8 depicts a process 800 for modifying a stored query in order to retrieve the selected subset of rows according to one embodiment of the invention. The process may begin at step 802 and continue to step 804 where the process enters a loop which iterates through each selected row. Accordingly, with respect to the rows selected in FIG. 7, the process will begin with the first selected row, which is row 3. At step 806, the identifier value for the selected row may be retrieved. Accordingly, the identifier value for row 3, the patient ID of 456, is the first identifier value retrieved. At step 808, a limiting condition containing the identifier value may be inserted into the stored query. Thus, with respect to the exemplary query shown in TABLE V, the "WHERE" clause may be modified to limit the query results to rows in Table1 (the table containing the identifier values) where the patient ID is 456. Accordingly, the limitation "(Table1.Patient_ID=456)" may be added to the "WHERE" clause of the exemplary query. The restriction on identifier values is enforced against results in Table2 by the portion of the "WHERE" clause which requires that the patient ID be identical for results from Table1 and Table2 ("Table1.Patient_ID=Table2.Patient_ID"). The partially modified exemplary query is depicted in TABLE VII.

TABLE VII

PARTIALLY MODIFIED EXEMPLARY QUERY

| | |
|---|---|
| 001 | SELECT |
| 002 | Table1.Patient_ID |
| 003 | Table1.Last_Name |
| 004 | Table2.Test_Type |
| 005 | Table2.Test_Results |
| 006 | WHERE |
| 007 | Table1. Patient_ID = Table2.Patient_ID AND |
| 008 | Table2.Test_Results > 40 AND |
| 009 | (Table1.Patient_ID=465) |
| 010 | ORDER BY |
| 011 | Table1.Patient_ID ASC |

After modifying the query at step 808, the loop iterating across each selected row may continue at step 804. Accordingly, the next selected row evaluated by the loop will be row 5. At step 806, the identifier value for that row (patient ID equal to 900) may be retrieved and at step 808 a limiting condition with the identifier value may be inserted into the query. Because the user wishes to update more than one row (rows 3, 5, and 6), the limiting condition may be inserted as an alternative (disjunctively) with respect to the other limiting conditions. Accordingly, the modification to the "WHERE" clause may become "(Table1.Patient_ID=465 OR Table1.Patient_ID=900)" after the second iteration of the loop.

After the third iteration of the loop, the identifier for the next selected row (Patient_ID equal to 905 for row 6) will also be added as a limitation and joined disjunctively to the other limiting conditions in the modified query, resulting in "(Table1.Patient_ID=465 OR Table1.Patient_ID=900 OR Table1.Patient_ID=905)". Thus, when the query is executed, the query will only select data containing one of the identifier values contained in the selected rows, causing the query to retrieve updated results for each of the selected rows. Furthermore, because the query contains a very limited condition in the "WHERE" clause (the condition selecting the identifier values), the database engine executing the modified query may optimize the execution of the modified query by causing the limiting condition to be applied first when the query is executed. Accordingly, when the remaining conditions in the modified query (such as the "Table2.Test_Results>40" condition) are executed, the remaining conditions will be executed against a more limited selection of rows (only those with the patient IDs of 465, 900, or 905) as compared to the original query (which may have been executed against all of the patient IDs), causing the modified query to retrieve and update the selected rows much more quickly and selectively than could be accomplished with the original query.

After the loop has iterated across each selected row, the loop may finish and the process 500 of updating the results may continue from step 810. The final result of the modification process 800 is shown in TABLE VIII.

TABLE VIII

MODIFIED EXEMPLARY QUERY

| | |
|---|---|
| 001 | SELECT |
| 002 | Table1.Patient_ID |
| 003 | Table1.Last_Name |
| 004 | Table2.Test_Type |
| 005 | Table2.Test_Results |
| 006 | WHERE |
| 007 | Table1.Patient_ID = Table2.Patient_ID AND |
| 008 | Table2.Test_Results > 40 AND |
| 009 | (Table1.Patient_ID=465 OR Table1.Patient_ID=900 OR |
| 010 | Table1.Patient_ID=905) |
| 011 | ORDER BY |
| 012 | Table1.Patient_ID ASC |

After the process 800 of modifying the query finishes, the query may be executed at step 522. At step 524, the results from the execution of the modified query may be obtained. The obtained results may depend on any changes which have taken place in the underlying database. Consider, for example, the changed test result table shown in TABLE IX. Changed values are marked by asterisks ("*")

TABLE IX

CHANGED EXEMPLARY TEST RESULT TABLE
Name: Table2

| Patient_ID | Test_Type | Test_Results | Test_Date |
|---|---|---|---|
| 123 | Type A | 44 | Sep. 1, 2004 |
| 456 | Type A | 47* | Nov. 30, 2004* |
| 456 | Type B | 38* | Nov. 9, 2004* |
| 789 | Type A | 48 | Sep. 12, 2004 |
| 900 | Type B | 48* | Nov. 21, 2004* |
| 905 | Type A | 44 | Sep. 2, 2004 |

TABLE IX-continued

CHANGED EXEMPLARY TEST RESULT TABLE
Name: Table2

| Patient_ID | Test_Type | Test_Results | Test_Date |
|---|---|---|---|
| 907* | Type A* | 44* | Nov. 22, 2004* |
| 907 | Type B | 42 | Aug. 22, 2004 |
| 921 | Type B | 44* | Nov. 8, 2004* |
| 930 | Type A | 39* | Nov. 28, 2004* |
| 930 | Type B | 39* | Sep. 15, 2004 |

Numerous changes in the underlying table may have taken place. For instance, some rows may have been added, some rows may have been deleted, and some rows may have been replaced with updated test results. After the modified query depicted in TABLE VII is executed at step 518 against the changed results shown in TABLE IX, the results obtained at step 520 will appear as in TABLE X.

TABLE X

RESULTS OF THE MODIFIED EXEMPLARY QUERY

| Patient_ID | Last_Name | Test_Type | Test_Results |
|---|---|---|---|
| 456 | Smith | Type A | 47 |
| 900 | Gibbons | Type B | 48 |
| 905 | Field | Type A | 44 |

With respect to the results depicted in TABLE X, only rows containing results which meet each condition of the modified query are returned. Accordingly, only rows containing at least one of the identifier values (Patient_ID=456, 900, or 905) from the selected subset of rows will be selected. If the values in the changed rows do not contain data meeting the original requirements of the query, the rows will not be selected. Furthermore, even though new rows may be added to the underlying table which meet the conditions of the original query (such as the new row for patient 907 with Test_Type A and a test result over 40, depicted in TABLE IX), if the new rows do not contain the identifier value for one of the selected rows, the new rows will not be included in the returned results.

Figure 9:
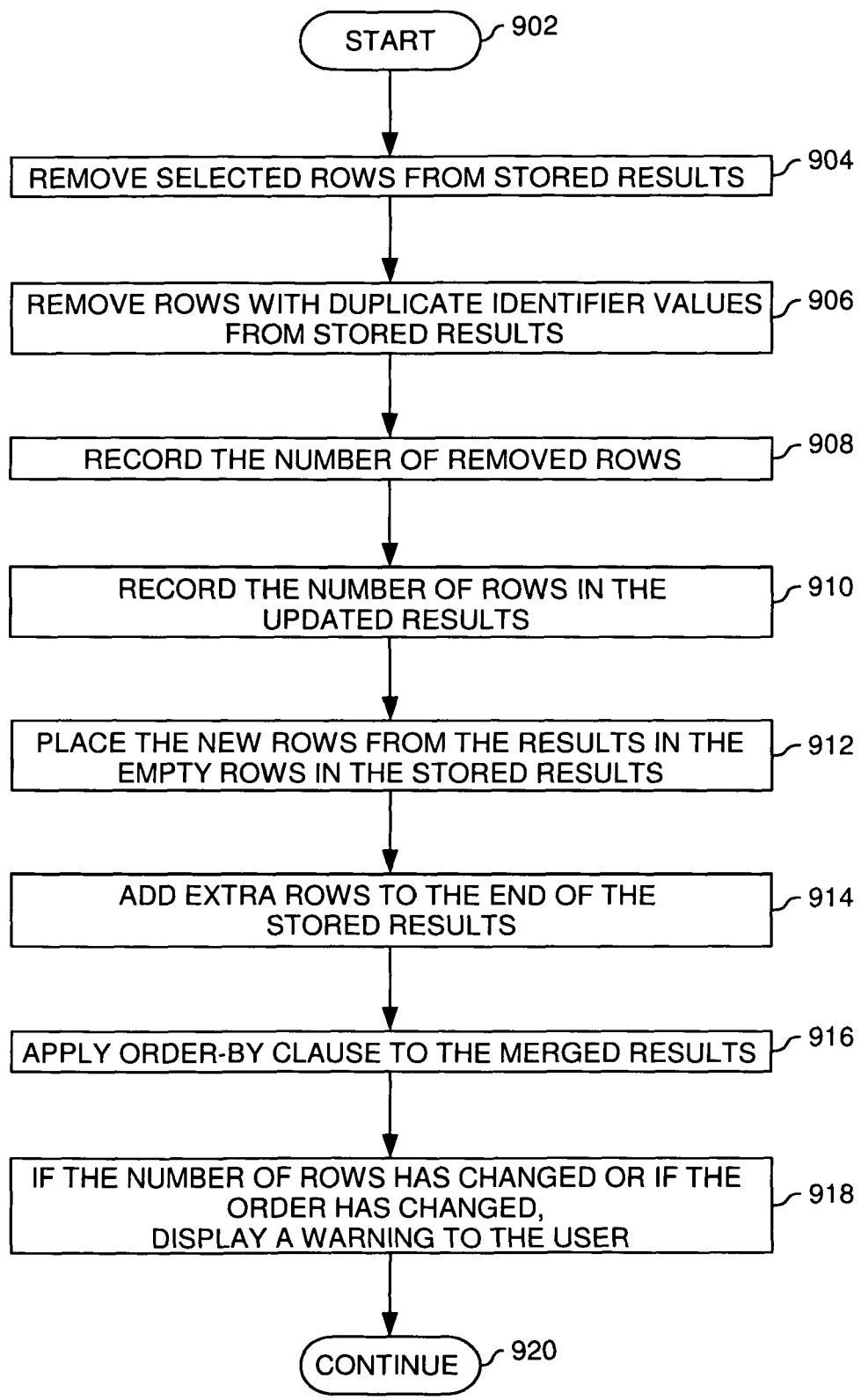
FIG. 9 depicts a process for merging updated results according to one embodiment of the invention.

After the updated results from the modified query are returned at step 524, the updated results may be merged with the stored results at step 526. FIG. 9 depicts a process 900 for merging updated results according to one embodiment of the invention. The process may begin at step 902 and continue to step 904 where the selected rows are removed from the stored results. The rows may be removed from the stored results in order to place the new, updated rows in the spaces where the removed rows were (described below).

After the selected rows are removed, the rows with duplicate identifier values (i.e., the same identifier values as the selected rows) may also be removed at step 906. Thus, as depicted in FIG. 7, row 3 with a patient ID of 465 is selected. Because the modified query may also retrieve an updated version of row 2, which has a duplicate identifier value (Patient_ID is also 456), row 2 must be deleted from the results in order to make a space for the updated version of the row, if any. In another embodiment of the invention, rows with duplicate identifier values may not be deleted unless an updated version of the row is actually available. In yet other embodiments of the invention, the selected rows and rows with duplicate values may be removed just after a request to update selected rows is received in order to make space for the updated results. The stored results, after removal of the selected rows and the rows with duplicate identifier values, may appear as shown in TABLE XI.

TABLE XI

STORED RESULTS OF THE EXEMPLARY
QUERY AFTER DELETING ROWS

| Patient_ID | Last_Name | Test_Type | Test_Results |
|---|---|---|---|
| 123 | Russell | Type A | 44 |
| 789 | Waters | Type A | 48 |
| 907 | Wilson | Type B | 42 |
| 930 | Turner | Type A | 41 |

At step 908, the number of removed rows may be recorded. The number of removed rows may be recorded in order to inform the user of the changes which have been made to the stored results. After recording the number of removed rows, the new rows from the results of the modified query may be placed in the empty rows in the stored results at step 912. If there are fewer updated rows returned by the modified query than empty rows in the stored results, some rows in the stored results may remain empty until the rows are sorted (described below). There may be fewer updated rows returned by the modified query because the original rows have been deleted since the original query was executed or because the original rows in the underlying table, after being modified or updated by other processes or users in the system, no longer satisfy the conditions of the modified query. Accordingly, with respect to the changed exemplary test result table shown in TABLE IX, the Type B test value for Patient_ID 456 has been changed to 38 for a new test performed on Nov. 11, 2004. While the modified query does allow rows with a Patient_ID of 456 to be selected, the modified query restricts those rows to test values of greater than 40. Thus, the Test B results for patient 456 do not satisfy the modified query and the row is not returned in the modified query results. If there are more updated rows returned by the modified query than empty rows in the stored results, the additional rows may be inserted at the end of the stored results at step 914. After the updated rows from the modified query results have been inserted into the stored results, the merged results may appear as shown in TABLE XII.

TABLE XII

STORED RESULTS OF THE EXEMPLARY
QUERY AFTER INSERTING ROWS

| Patient_ID | Last_Name | Test_Type | Test_Results |
|---|---|---|---|
| 123 | Russell | Type A | 44 |
| 456 | Smith | Type A | 47 |
| 900 | Gibbons | Type B | 48 |
| 789 | Waters | Type A | 48 |
| 905 | Field | Type A | 44 |
| 907 | Wilson | Type B | 42 |
| 930 | Turner | Type A | 41 |

After the updated rows have been inserted, the "ORDER BY" clause of the modified query may be applied to the merged results at step 916. For the modified query shown in Table VII, the "ORDER BY" clause specifies that the results be sorted by the Patient_ID value in ascending order. When the "ORDER BY" clause is applied to the merged results, any blank rows will be placed at the end of the merged results and effectively deleted. The results of applying the "ORDER BY" clause are depicted in TABLE XIII.

TABLE XIII

STORED RESULTS OF THE EXEMPLARY QUERY AFTER
APPLYING THE "ORDER BY CLAUSE"

| Patient_ID | Last_Name | Test_Type | Test_Results |
|---|---|---|---|
| 123 | Russell | Type A | 44 |
| 456 | Smith | Type A | 47 |
| 789 | Waters | Type A | 48 |
| 900 | Gibbons | Type B | 48 |
| 905 | Field | Type A | 44 |
| 907 | Wilson | Type B | 42 |
| 930 | Turner | Type A | 41 |

After the updated rows and the stored results have been merged and ordered, a determination may be made of whether the number of rows has changed or whether the order of the rows has changed. To determine if the number of rows has changed, the number of removed rows may be compared to the number of inserted rows. To determine if the order of the merged results has changed, the merged results may be compared with the original stored results. If the number of rows has changed or the order has changed, a warning may be displayed to the user at step 918. The warning may be a textual message displayed along with the results, a pop-up box, highlighting or italicizing of the changed rows, or any other warning known to those skilled in the art.

After the process 900 of merging the results is finished, the process 500 of saving and updating the results may continue after step 920. At step 528, the merged results may be displayed. The merged results may be displayed in a graphical user interface, such as the graphical user interface 600 depicted in FIG. 10, according to one embodiment. The changed values may be italicized as shown in FIG. 10. According to other embodiments of the invention, the changed values may be highlighted or displayed next to the original stored values for comparison. After the merged results have been displayed, the process 500 of updating the results may terminate at step 530.

Other embodiments of the invention are also contemplated which provide different variations of the above process of storing and updating query results. For instance, one embodiment may provide that selected rows are not be deleted from the stored results where the row has been deleted from the underlying table in the database. As an alternative, such rows may remain in the merged results, but the row may be marked with a notification message which explains that the underlying data contained in the row has been deleted.

Updating Query Results with Results in Restricting Fields

In some cases, a user may wish to update rows in a more selective manner. For instance, the user may wish identify rows to be updated based on more specific criteria than identifier values for each row, especially where a given identifier value identifies more rows in the query results than the user wishes to update. Thus, with respect to the query results depicted in the graphical user interface 600 in FIG. 6, if the user selects row 2 to be updated, using the above method for updating query results may cause both rows 2 and 3 to be updated because both rows are identified by the same identifier value (Patient_ID equal to 456). In some cases, the user may wish to update all of the data regarding patient 456. In other cases, the user may only wish to update the selected row.

To allow the user to be more selective in updating rows, the user may be provided with modified queries which utilize restricting fields. Restricting fields, as the name implies, restrict modified queries so that only updated rows containing both the identifier value and the value in the restricting field are returned. Values in restricting fields may be referred to as restricting values. As an example of the use of restricting fields, if the user uses the graphical user interface 600 to select row 2 to be updated, and if the Test_Type column is designated as a restricting field, the modified query will only update rows with a matching identifier value (Patient_ID equal to 456) and a matching restricting value in the restricting field (Test_Type equal to "Type A", where "Type A" is the restricting value). According to one embodiment of the invention, the user may be allowed to specify which columns in the query results should be used as restricting fields. According to another embodiment of the invention, the restricting fields may be defined as an attribute of a logical field in a data repository abstraction (described above).

The process for storing and updating stored results utilizing restricting fields is similar to the process depicted in FIG. 5 for storing and updating results where restricting fields are not used. According to one embodiment, the process for updating results using restricting fields may only differ with respect to modifying the stored query and merging the updated results (both of which are described below). Thus, the process may begin by storing the query, query results, and identifier values for the results. After the query information is stored, the process may retrieve and display the results, and a request to update a selected subset of rows in the stored results may be received. Upon receiving a request to update selected rows, the stored query and identifier values may be retrieved, and the query may be modified using identifier values and restricting fields to retrieve the selected rows.

Figure 11:
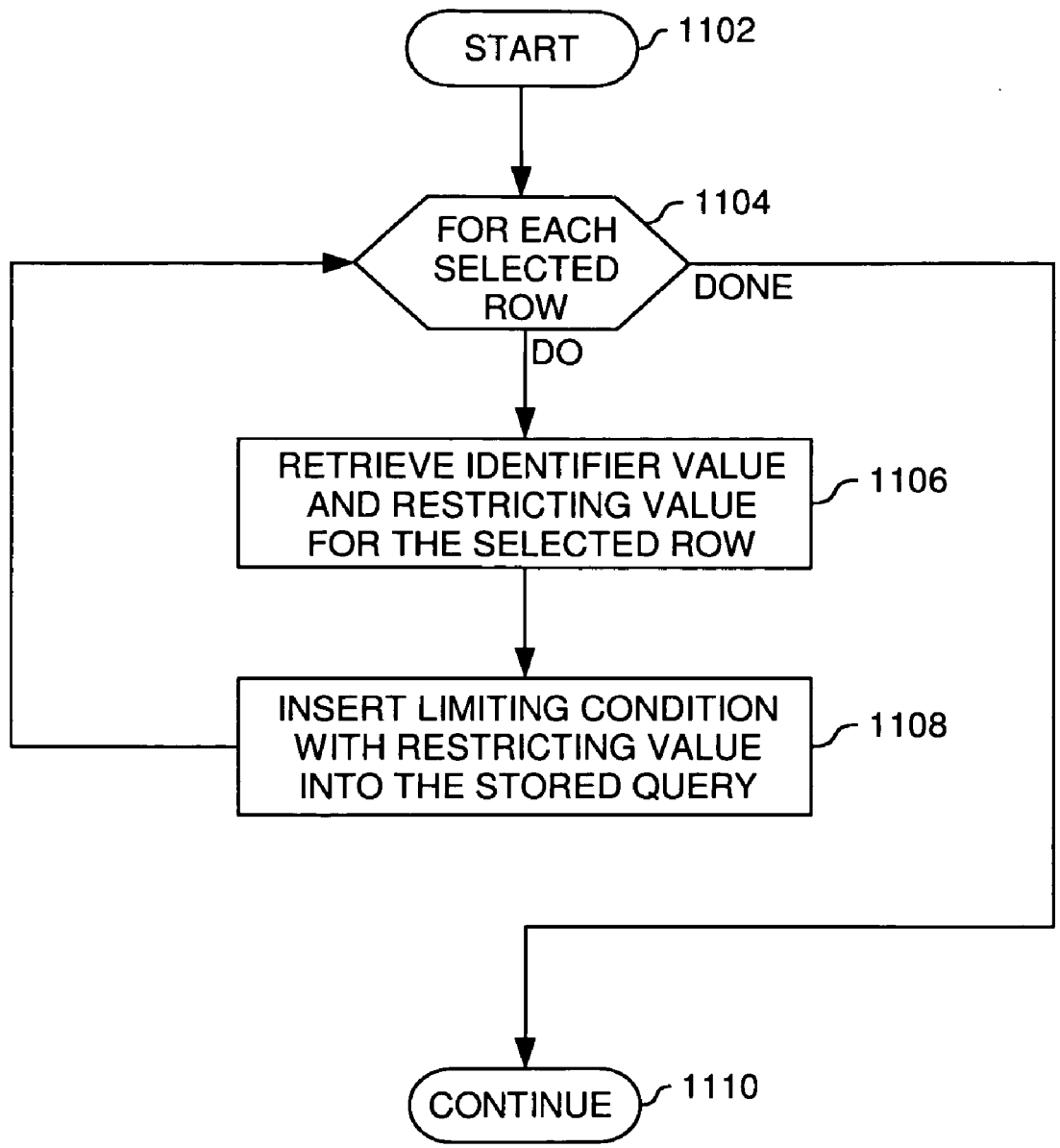
FIG. 11 depicts a process for using restricting fields to modify a stored query in order to retrieve a selected subset of rows according to one embodiment of the invention.

FIG. 11 depicts a process 1100 for using restricting fields to modify the stored query in order to retrieve the selected subset of rows according to one embodiment of the invention. The process may begin at step 1102 and continue to step 1104 where the process enters a loop which iterates through each selected row. Consider, for example, the case where a user has selected rows 2 and row 5 from the results (depicted in FIG. 6 and based on the exemplary database tables, exemplary query, and exemplary results shown in Tables III-VII) and initiated a request to update the rows. The loop will begin with the first selected row (row 2). At step 1106, the identifier value and the restricting value for the selected row may be retrieved. Accordingly, the identifier value for row 2, Patient_ID equal to 456, is the first identifier value retrieved, and the restricting value for row 2, Test_Type equal to "Type" A, is the first restricting value retrieved. At step 1108, a limiting condition containing the identifier value and the restricting value may be inserted into the stored query. Thus, with respect to the exemplary query shown in Table V, the "WHERE" clause may be modified to limit the query results to rows in Table1 (the table containing the identifier values) where the Patient_ID is 456 and to rows in Table2 (the table containing the restricting field and associated values) where the Test_Type is "Type A". Accordingly, the limitation "((Table1.Patient_ID=456) AND (Table2.Test_Type="Type A"))" may be added to the "WHERE" clause of the exemplary query. The restriction on identifier values is enforced against results in Table2 by the portion of the "WHERE" clause which requires that the patient ID be identical for results from Table1 and Table2 ("Table1.Patient_ID=Table2.Patient_ID"). The restricting field is enforced by the portion of the query limitation which requires that the results contain the restricting value from the selected row ("Table2.Test_Type="Type A""). The combination of the identifier value and the restricting value narrow the scope of the modified exemplary query to updated result rows with both values (because they are ANDed). The partially modified exemplary query with restricting values is depicted in TABLE XIV.

TABLE XIV

PARTIALLY MODIFIED EXEMPLARY QUERY
(WITH RESTRICTING VALUES)

| | |
|---|---|
| 001 | SELECT |
| 002 | Table1.Patient_ID |
| 003 | Table1.Last_Name |
| 004 | Table2.Test_Type |
| 005 | Table2.Test_Results |
| 006 | WHERE |
| 007 | Table1.Patient_ID = Table2.Patient_ID AND |
| 008 | Table2.Test_Results > 40 AND |
| 009 | ((Table1.Patient_ID = 456) AND (Table2.Test_Type = "Type A")) |
| 010 | ORDER BY |
| 011 | Table1.Patient_ID ASC |

After modifying the query at step 1108, the loop iterating across each selected row may continue at step 1104. Accordingly, the next selected row evaluated by the loop will be row 5. At step 1106, the identifier value for that row (Patient_ID equal to 900) may be retrieved and at step 1108 and a limiting condition with the identifier value and restricting value may be inserted into the query at step 1110. Because the user wishes to update more than one row (rows 3 and 5), the limiting condition may be inserted as an alternative (disjunctively) with respect to the other limiting conditions. Accordingly, the modification to the "WHERE" clause may become "(((Table1.Patient_ID=456) AND (Table2.Test_Type="Type A")) OR ((Table1.Patient_ID=900) AND (Table2.Test_Type="Type B")))" after the second iteration of the loop. Thus, when the query is executed, the query will only select data containing at least one of the identifier values contained in the selected rows along with the restricting value from the same row, causing the query to retrieve updated results for each of the selected rows.

After the loop has iterated across each selected row, the loop may finish and the process of updating the results may continue from step 1110. The final result of the query modification process 1100 is shown in TABLE XV.

TABLE XV

MODIFIED EXEMPLARY QUERY
(WITH RESTRICTING VALUES)

| | |
|---|---|
| 001 | SELECT |
| 002 | Table1.Patient_ID |
| 003 | Table1.Last_Name |
| 004 | Table2.Test_Type |
| 005 | Table2.Test_Results |
| 006 | WHERE |
| 007 | Table1.Patient_ID = Table2.Patient_ID AND |
| 008 | Table2.Test_Results > 40 AND |
| 009 | (((Table1.Patient_ID = 456) AND (Table2.Test_Type = "Type A")) OR |
| 010 | ((Table1.Patient_ID=900) AND (Table2.Test_Type = "Type B"))) |
| 011 | ORDER BY |
| 012 | Table1.Patient_ID ASC |

After the process 1100 of modifying the query finishes, the query may be executed and the results from the execution of the modified query may be obtained. As before, the obtained results may depend on any changes which have taken place in the underlying database. For instance, after the modified query depicted in TABLE XV is executed against the changed results shown in TABLE IX, the results obtained from the modified query will appear as in TABLE XVI.

TABLE XVI

RESULTS OF THE MODIFIED EXEMPLARY
QUERY (WITH RESTRICTING VALUES)

| Patient_ID | Last_Name | Test_Type | Test_Results |
|---|---|---|---|
| 456 | Smith | Type A | 47 |
| 900 | Gibbons | Type B | 48 |

With respect to the results depicted in TABLE XVI, only rows containing results which meet each condition of the modified query are returned. Accordingly, only rows containing at least one combination of identifier values and restricting values (456 and "Type A" or 900 and "Type B") from the selected subset of rows were selected.

Figure 12:
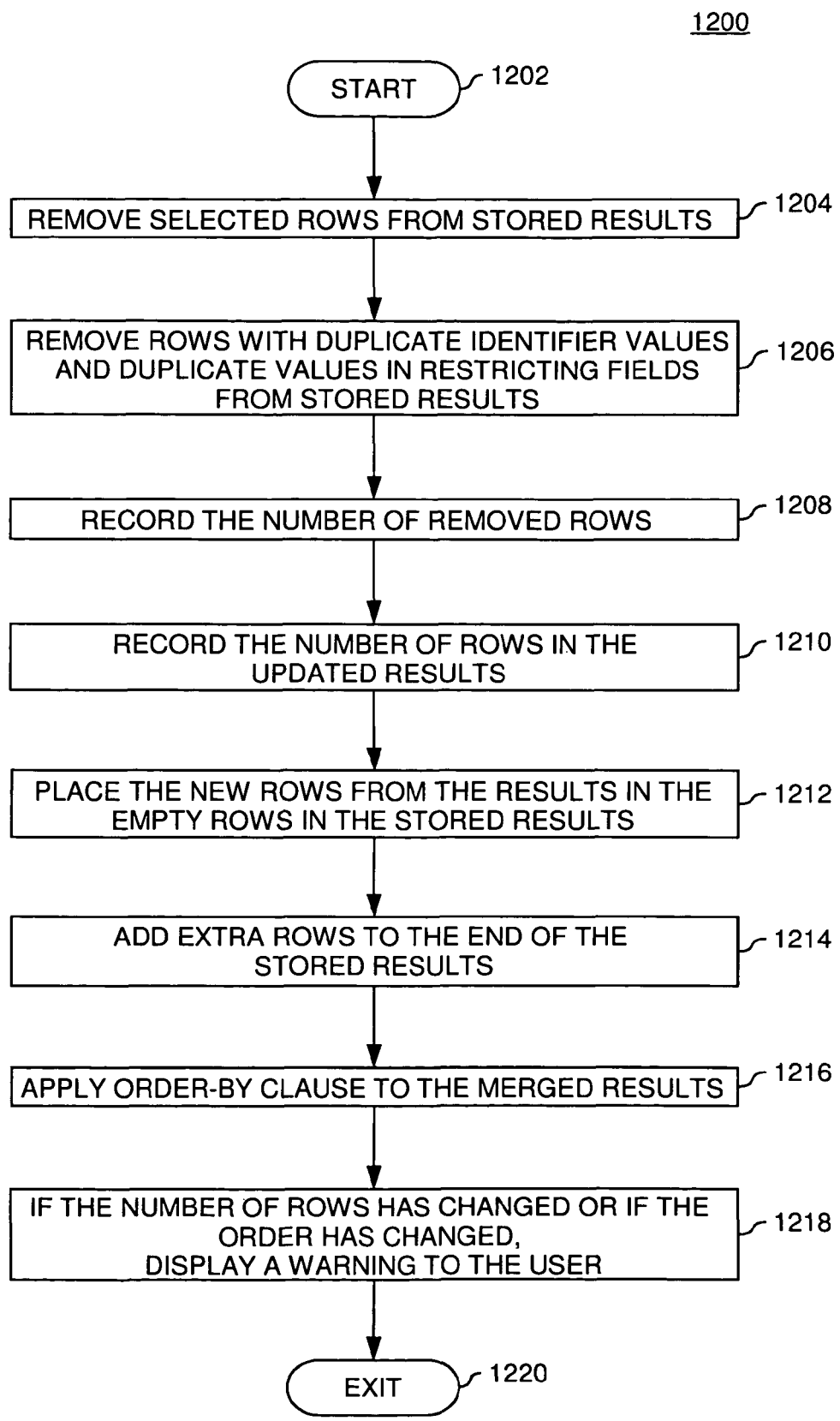
FIG. 12 depicts a process for merging updated results with stored results containing restricting fields according to one embodiment of the invention.

After the updated results from the modified query are returned, the updated results may be merged with the stored results. FIG. 12 depicts a process 1200 for merging updated results with stored results containing restricting fields according to one embodiment of the invention. The process may begin at step 1202 and continue to step 1204 where the selected rows are removed from the stored results. The rows may be removed from the stored results in order to place the new, updated results in the spaces where the old rows were removed (described below).

After the selected rows are removed, the rows containing both the duplicate identifier values (the same identifier values as the selected rows) and the duplicate values in restricting fields may be removed at step 1206. The duplicate values may be removed in case more than one row in the stored results and in the updated results match the conditions imposed by a selected row (for instance, if two rows contained both Patient_ID=456 and Test_Type="Type A"). Before, where restricting fields were not used (see description above with respect to FIG. 9), the removal of duplicative rows resulted in removed rows which were not selected. Specifically, with respect to FIG. 6, row 2, with an identifier value of 456 and Test_Type of "Type A", was removed as well as row 3 which also had an identifier value of 456 but a Test_Type of Type B. The extra rows were removed because the only limiting condition used by the modified query was the identifier value (456), and the identifier value was not unique for each row (rows 2 and 3 both contain the identifier value of 456).

Where restricting fields are used, the modified query and the merging process 1200 are more selective as to how the results are updated. Accordingly, where row 2 is selected to be updated, the merging process 1200 only removes row 2 (identifier value of 456 and restricting value of Test_Type="Type A"), but row 3 is not removed because the identifier value (Patient_ID=456) and restricting value (Test_Type="Type B") do not match both the identifier and restricting values from the selected row.

The modified results, after removal of the selected rows (rows 2 and 5) and after removal of the rows with duplicated identifier values and restricting values (none of the rows for the exemplary results shown in Table VI), may appear as shown in TABLE XI.

TABLE XI

MODIFIED RESULTS OF THE EXEMPLARY QUERY AFTER DELETING ROWS (WITH RESTRICTING VALUES)

| Patient_ID | Last_Name | Test_Type | Test_Results |
|---|---|---|---|
| 123 | Russell | Type A | 44 |
| 456 | Smith | Type B | 48 |
| 789 | Waters | Type A | 48 |
| 905 | Field | Type A | 44 |
| 907 | Wilson | Type B | 42 |
| 930 | Turner | Type A | 41 |

At step 1208, the number of removed rows may be recorded. The number of removed rows may be recorded in order to inform the user of the changes which have been made to the stored results. After recording the number of removed rows, the new rows from the results of the modified query may be placed in the empty rows in the stored results at step 1212. As described above, if there are fewer updated rows returned by the modified query than empty rows in the stored results, some rows in the stored results may remain empty until the rows are sorted. If there are more updated rows returned by the modified query than empty rows in the stored results, the additional rows may be inserted at the end of the stored results at step 1214. After the updated rows have been inserted, the "ORDER BY" clause of the modified query may be applied to the merged results at step 1216. After the updated rows from the modified query results have been inserted into the stored results and the "ORDER BY" clause has been applied, the merged results may appear as shown in TABLE XII.

TABLE XII

MERGED RESULTS (WITH RESTRICTING VALUES)

| Patient_ID | Last_Name | Test_Type | Test_Results |
|---|---|---|---|
| 123 | Russell | Type A | 44 |
| 456 | Smith | Type A | 47 |
| 456 | Smith | Type B | 48 |
| 789 | Waters | Type A | 48 |
| 900 | Gibbons | Type B | 48 |
| 905 | Field | Type A | 44 |
| 907 | Wilson | Type B | 42 |
| 930 | Turner | Type A | 41 |

After the updated rows and the stored results have been merged and ordered, a determination may be made of whether the number of rows has changed or whether the order of the rows has changed. If the number of rows has changed or the order has changed, a warning may be displayed to the user at step 1218. After the process 1200 of merging the results is finished, the process of saving and updating the results may continue at step 1220. As before, the merged results may be displayed and the process of updating the results may then terminate.

While embodiments are described above with respect to usage of a single restricting field, other embodiments are contemplated in which multiple restricting fields are utilized. Accordingly, multiple restricting fields as well as identifier values may be used to more specifically select and update rows from stored query results.

While the foregoing is directed to embodiments of the present invention, other and further embodiments of the invention may be devised without departing from the basic scope thereof, and the scope thereof is determined by the claims that follow.

What is claimed is:

1. A computer-implemented method for updating query results, the method comprising:
   receiving original results retrieved from executing a query, wherein the original results contain two or more rows, wherein each row is identified by a respective identifier value, wherein each row contains a data value in a restricting data field, and wherein each row includes one or more entries;
   storing the query, the original results, and an indication of a number of rows included in the original results;
   receiving a user input request to re-retrieve only a user-selected subset of two or more rows in the original results to reflect any changes to the user-selected subset occurring subsequent to executing the query, the subset being less than all of the two or more rows, wherein the request explicitly identifies each row of the selected subset by the respective identifier value;
   retrieving the stored query from storage; and
   in response to the user input request, re-retrieving only the user-selected subset of the two or more rows in the original results, comprising:
      modifying the retrieved query to produce a modified query which when executed re-retrieves the selected subset of rows without re-retrieving a remaining portion of the two or more rows, wherein modifying the retrieved query comprises inserting a first query condition into the retrieved query, wherein the first query condition contains the respective data value in the restricting data field for the selected subset of rows;
      executing the modified query;
      obtaining updated entries from the modified query;
      removing the selected rows from the original results;
      inserting the updated entries from the modified query into the original results to create a merged set of results;
      displaying the merged set of results; and
      only upon determining that a number of rows in the merged set of results has changed from the number of rows in the original results, displaying an indication of the changed number of rows.

2. The method of claim 1, wherein the first query condition limits the updated entries from the modified query to only the rows containing the respective data value in the restricting data field of the selected subset of rows.

3. The method of claim 1, wherein modifying the retrieved query further comprises inserting a second query condition into the query wherein the second query condition contains the respective identifier value for the selected subset of rows.

4. The method of claim 1 wherein modifying the retrieved query further comprises inserting a restrictive query condition into the retrieved query.

5. The method of claim 4 wherein the restrictive query condition limits the updated entries from the modified query to on the selected subset of rows.

6. The method of claim 1, wherein the restricting data field is selected by a user.

7. The method of claim 1, wherein the restricting data field is defined as a logical field in a data abstraction layer, wherein the definition for each logical field in the data abstraction layers specifies (i) a name, and (ii) an access method that maps the logical field to data in an underlying data repository and wherein the retrieved query is derived from an abstract query composed of logical fields defined in the data abstraction layer.

8. A method of programmatically providing a user interface for updating query results, comprising:
 providing graphical user interface content which defines a graphical user interface, comprising:
  a listing of two or more results rows, the results rows retrieved from executing a query, wherein each of the rows includes one or more column entries, and wherein each of the rows is identified by a respective identifier value;
  a graphical selection element for each of the two or more results rows which may be used to select each of the two or more results rows individually;
 receiving a user input request to re-retrieve only one or more user-selected rows from the two or more results rows to reflect any changes to the one or more user-selected rows occurring subsequent to executing the query, wherein the graphical selection element for each of the two or more results rows is used to individually select the one or more selected rows, and wherein the request explicitly identifies each row of the selected subset by the respective identifier value; and
 in response to the user input request, re-retrieving only the one or more user-selected rows, comprising:
  modifying the query to re-retrieve and update the one or more selected rows without re-retrieving a remaining portion of the two or more results rows; and
  for at least those of the one or more selected rows having updated values, retrieving the updated values, the updated values being returned as results of the executed modified query;
  marking each row of the two or more result rows having updated values;
  inserting the updated column entries for the one or more selected rows into a respective corresponding row to form a set of merged results, wherein the set of merged results includes each marked row and the corresponding row having the updated column entries; and
  displaying the set of merged results.

9. The method of claim 8, wherein the query is modified by adding a condition containing an identifying value for each of the one or more selected rows.

10. The method of claim 8, wherein the modified results are modified by removing outdated entries of the one or more selected rows.

11. A computer-implemented method for updating query results, the method comprising:
 receiving results retrieved from executing a query, wherein the results contain two or more rows, wherein each row includes one or more entries, wherein each row is identified by a respective identifier value, wherein each row contains a data value in a user-selected restricting data field, wherein each row includes one or more entries, wherein the restricting data field is defined as a logical field in a data abstraction layer, wherein a definition for each logical field in the data abstraction layer specifies (i) a name, and (ii) an access method that maps the logical field to data in an underlying data repository, and wherein the query is derived from an abstract query composed of logical fields defined in the data abstraction layer;
 storing the query and the results;
 receiving a user input request to re-retrieve only a user-selected subset of the two or more rows in the stored results to reflect any changes to the user-selected subset occurring subsequent to executing the query, the subset being less than all of the two or more rows, wherein the request explicitly identifies each row of the selected subset by the respective identifier value;
 retrieving the stored query from storage; and
 in response to the user input request, re-retrieving only the user-selected subset of the two or more rows in the stored results, comprising:
  modifying the retrieved query to produce a modified query which when executed re-retrieves the selected subset of rows without re-retrieving a remaining portion of the two or more rows, wherein modifying the retrieved query comprises inserting a query condition into the retrieved query, wherein the query condition contains the respective data value in the restricting data field for the selected subset of rows;
  executing the modified query;
  obtaining updated entries from the modified query;
  determining a number of rows with outdated entries;
  removing the outdated entries of one or more of the selected rows;
  inserting the updated entries for the one or more selected rows;
  displaying the updated entries; and
  displaying an indication of the number of rows with the outdated entries having been updated with the updated entries.

12. A computer-readable storage medium containing a program, which, when executed on a processor, performs an operation for updating query results, comprising:
 receiving original results retrieved from executing a query, wherein the original results contain two or more rows, wherein each row is identified by a respective identifier value, wherein each row contains a data value in a restricting data field, and wherein each row includes one or more entries;
 storing the query, the original results, and an indication of a number of rows included in the original results;
 receiving a user input request to re-retrieve only a user-selected subset of two or more rows in the original results to reflect any changes to the user-selected subset occurring subsequent to executing the query, the subset being less than all of the two or more rows, wherein the request explicitly identifies each row of the selected subset by the respective identifier value;
 retrieving the stored query from storage; and
 in response to the user input request, re-retrieving only the user-selected subset of the two or more rows in the original results, comprising:
  modifying the retrieved query to produce a modified query which when executed re-retrieves the selected subset of rows without re-retrieving a remaining portion of the two or more rows, wherein modifying the retrieved query comprises inserting a first query condition into the retrieved query, wherein the first query condition contains the respective data value in the restricting data field for the selected subset of rows;
  executing the modified query;
  obtaining updated entries from the modified query;
  removing the selected rows from the original results;
  inserting the updated entries from the modified query into the original results to create a merged set of results;
  displaying the merged set of results; and
  only upon determining that a number of rows in the merged set of results has changed from the number of rows in the original results, displaying an indication of the changed number of rows.

13. The computer-readable storage medium of claim 12, wherein the first query condition limits the updated entries from the modified query to only the rows containing the respective data value in the restricting data field of the selected subset of rows.

14. The computer-readable storage medium of claim 12, wherein modifying the retrieved query further comprises inserting a second query condition into the query wherein the second query condition contains the respective identifier value for the selected subset of rows.

15. The computer-readable storage medium of claim 12 wherein modifying the retrieved query further comprises inserting a restrictive query condition into the retrieved query.

16. The computer-readable storage medium of claim 15 wherein the restrictive query condition limits the updated entries from the modified query to on the selected subset of rows.

17. The computer-readable storage medium of claim 12, wherein the restricting data field is selected by a user.

18. The computer-readable storage medium of claim 12, wherein the restricting data field is defined as a logical field in a data abstraction layer, wherein the definition for each logical field in the data abstraction layers specifies (i) a name, and (ii) an access method that maps the logical field to data in an underlying data repository and wherein the retrieved query is derived from an abstract query composed of logical fields defined in the data abstraction layer.

* * * * *